(12) United States Patent
Akkarakaran et al.

(10) Patent No.: US 11,558,877 B2
(45) Date of Patent: Jan. 17, 2023

(54) MANAGING AN OVERLAP BETWEEN A SET OF RESOURCES ALLOCATED TO A POSITIONING REFERENCE SIGNAL AND A SET OF RESOURCES ALLOCATED TO A PHYSICAL CHANNEL

(71) Applicant: QUALCOMM Incorporated, San Diego, CA (US)

(72) Inventors: Sony Akkarakaran, Poway, CA (US); Tao Luo, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/679,614

(22) Filed: Nov. 11, 2019

(65) Prior Publication Data

US 2020/0154449 A1    May 14, 2020

(30) Foreign Application Priority Data

Nov. 12, 2018 (GR) .............................. 20180100515

(51) Int. Cl.
| H04W 72/10 | (2009.01) |
| H04W 72/04 | (2009.01) |
| H04L 5/00 | (2006.01) |

(52) U.S. Cl.
CPC .......... *H04W 72/10* (2013.01); *H04L 5/0048* (2013.01); *H04W 72/0413* (2013.01)

(58) Field of Classification Search
CPC ............. H04W 72/10; H04W 72/0413; H04W 72/1242; H04L 5/0048; H04L 5/0057;
(Continued)

(56) References Cited

U.S. PATENT DOCUMENTS

| 11,026,237 B2 | 6/2021 | Zhang et al. |
| 2010/0273506 A1 | 10/2010 | Stern-Berkowitz et al. |

(Continued)

FOREIGN PATENT DOCUMENTS

| WO | 2015094914 A1 | 6/2015 |
| WO | 2018203278 A1 | 11/2018 |

OTHER PUBLICATIONS

International Search Report and Written Opinion—PCT/US2019/060912—ISA/EPO—dated Apr. 14, 2020.

(Continued)

*Primary Examiner* — Dady Chery
(74) *Attorney, Agent, or Firm* — Qualcomm Incorporated

(57) ABSTRACT

Disclosed are techniques for handling an overlap between a higher priority channel and a lower priority channel. In an aspect, a transmitter node detects an overlap between an allocation of a first set of resources of a wireless communication link for transmission of the lower priority channel and an allocation of a second set of resources of the wireless communication link for transmission of the higher priority channel, removes a subset of resources from the first set of resources to generate a removed subset of resources of the first set of resources and a remaining subset of resources of the first set of resources, and transmits, to a receiver node, the lower priority channel on the remaining subset of resources, wherein the higher priority channel is transmitted on the removed subset of resources, wherein the higher priority channel or the lower priority channel is a positioning reference signal.

21 Claims, 10 Drawing Sheets

(58) Field of Classification Search
CPC ... H04L 5/0053; H04L 5/001; H04L 27/0006; H04L 5/0007; H04L 5/0064; H04L 5/0091
See application file for complete search history.

(56) References Cited

U.S. PATENT DOCUMENTS

| | | |
|---|---|---|
| 2010/0322184 A1 | 12/2010 | Xiao |
| 2011/0081933 A1 | 4/2011 | Suh et al. |
| 2011/0252139 A1 | 10/2011 | Bhattad et al. |
| 2012/0083288 A1 | 4/2012 | Siomina |
| 2012/0250551 A1 | 10/2012 | Sartori et al. |
| 2016/0037545 A1* | 2/2016 | Prajapati ........... H04W 72/1215 370/329 |
| 2016/0080121 A1 | 3/2016 | Kim et al. |
| 2016/0192379 A1* | 6/2016 | Behravan ............ H04L 5/001 370/329 |
| 2017/0237592 A1 | 8/2017 | Yang et al. |
| 2017/0367116 A1* | 12/2017 | Li ..................... H04W 72/048 |
| 2018/0007625 A1* | 1/2018 | Yu .......................... H04W 48/12 |
| 2018/0054792 A1 | 2/2018 | Lee et al. |
| 2018/0070341 A1 | 3/2018 | Islam et al. |
| 2018/0097596 A1 | 4/2018 | Palanivelu et al. |
| 2018/0146485 A1 | 5/2018 | Yang et al. |
| 2019/0089568 A1 | 3/2019 | Abedini et al. |
| 2019/0098608 A1 | 3/2019 | Yi et al. |
| 2019/0162817 A1 | 5/2019 | Priyanto et al. |
| 2019/0313443 A1* | 10/2019 | Li ..................... H04W 72/048 |
| 2019/0380056 A1 | 12/2019 | Lee et al. |
| 2020/0014487 A1 | 1/2020 | Akkarakaran et al. |
| 2020/0092880 A1 | 3/2020 | Choi et al. |
| 2020/0163068 A1 | 5/2020 | Takeda et al. |
| 2020/0228240 A1 | 7/2020 | Hong et al. |
| 2020/0351815 A1 | 11/2020 | Kim et al. |

OTHER PUBLICATIONS

NEC Group: "Collision of PMCH and PRS Transmission in the Same MBSFN Subframe", 3GPP Draft, 3GPP TSG-RAN WG1 #64, R1-110747, Collision of PMCH and PRS Transmission in the Same Subframe, 3RD Generation Partnership Project (3GPP), Mobile Competence Centre, 650, Route Des Lucioles, F-06921, Sophia-Antipolis Cedex, France, vol. RAN WG1, No. Taipei, Taiwan, 20110221-20110225, Feb. 15, 2011 (Feb. 15, 2011), XP050490549, 3 pages, [retrieved on Feb. 15, 2011], Collision of PMCH and PRS Transmissions, p. 1, paragraph 2—p. 3.

PANTECH: "Discussion on Collision Avoidance Between CSI-RS and PRS", 3GPP Draft, 3GPP TSG RAN WG1 Meeting #64, R1-110753, 3RD Generation Partnership Project (3GPP), Mobile Competence Centre, 650, Route Des Lucioles, F-06921, Sophia-Antipolis Cedex, France, vol. RAN WG1, No. Taipei, Taiwan, 20110221-20110225, Feb. 15, 2011 (Feb. 15, 2011), XP050490553, 5 pages, [retrieved on Feb. 15, 2011], Discussion, p. 1, paragraph 2—p. 4.

ITL: "Support of OTDOA in NB—IoT", 3GPP Draft, R1-1610221, 3GPP TSG RAN WG1 Meeting #86bis, 3RD Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150240, 10 Pages, Retrieved from the Internet: URL:http://www.3gpp.org/ftp/Meetings_3GPP_SYNC/RAN1/Docs/ [retrieved on Oct. 9, 2016].

Nokia., et al., "Handling of Mapping of ePDCCH in Presence of Other Signals", R1-122422, 3GPP TSG RAN WG1 Meeting #69, Prague, Czech Republic, May 21-25, 2012, 4 Pages.

Qualcomm Incorporated: "Nprs Enhancement", R1-1807094, 3GPP TSG RAN WG1 Meeting #93, Busan, Korea, May 21-25, 2018, pp. 1-9.

* cited by examiner

MANAGING AN OVERLAP BETWEEN A SET OF RESOURCES ALLOCATED TO A POSITIONING REFERENCE SIGNAL AND A SET OF RESOURCES ALLOCATED TO A PHYSICAL CHANNEL

CROSS-REFERENCE TO RELATED APPLICATION

The present Application for Patent claims priority under 35 U.S.C. § 119 to Greek Patent Application No. 20180100515, entitled "MANAGING AN OVERLAP BETWEEN A SET OF RESOURCES ALLOCATED TO A POSITIONING REFERENCE SIGNAL AND A SET OF RESOURCES ALLOCATED TO A PHYSICAL CHANNEL," filed Nov. 12, 2018, assigned to the assignee hereof, and expressly incorporated herein by reference in its entirety.

INTRODUCTION

1. Technical Field

Various aspects described herein generally relate to managing an overlap between a set of resources allocated to a positioning reference signal and a set of resources allocated to a physical channel.

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple aAccess (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" (NR)), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a transmitter node includes detecting an overlap between an allocation of a first set of resources of a wireless communication link for transmission of a lower priority channel and an allocation of a second set of resources of the wireless communication link for transmission of the higher priority channel, removing a subset of the first set of resources to generate a removed subset of resources of the first set of resources and a remaining subset of resources of the first set of resources, and transmitting, to a receiver node, the lower priority channel on the remaining subset of resources of the first set of resources, wherein the higher priority channel is transmitted on at least a portion of the removed subset of resources of the first set of resources, wherein at least one of the higher priority channel and the lower priority channel is a positioning reference signal.

In an aspect, a method of wireless communication performed by a user equipment (UE) includes receiving, from a serving cell of a base station, an allocation of a first set of resources of a wireless communication link for transmission of a lower priority channel to the serving cell, detecting an overlap between the first set of resources of the wireless communication link allocated for transmission of the lower priority channel and a second set of resources of the wireless communication link allocated for transmission of a higher priority channel, and rejecting the allocation of the first set of resources for transmission of the lower priority channel based on the overlap, wherein at least one of the higher priority channel and the lower priority channel is a positioning reference signal.

In an aspect, a transmitter node includes a memory, a communication device, and at least one processor coupled to the memory and configured to: detect an overlap between an allocation of a first set of resources of a wireless communication link for transmission of a lower priority channel and an allocation of a second set of resources of the wireless communication link for transmission of a higher priority channel, remove a subset of resources from the allocation of the first set of resources to generate a removed subset of resources of the first set of resources and a remaining subset of resources of the first set of resources, and cause the communication device to transmit, to a receiver node, the lower priority channel on the remaining subset of resources of the first set of resources, wherein the higher priority channel is transmitted on at least a portion of the removed subset of resources of the first set of resources, wherein at least one of the higher priority channel and the lower priority channel is a positioning reference signal.

In an aspect, a user equipment (UE) includes a memory, a communication device, and at least one processor coupled to the memory and configured to: cause the communication device to receive, from a serving cell of a base station, an allocation of a first set of resources of a wireless communication link for transmission of a lower priority channel to the serving cell, detect an overlap between the first set of resources of the wireless communication link allocated for transmission of the lower priority channel and a second set of resources of the wireless communication link allocated for transmission of the higher priority channel, and reject the allocation of the first set of resources for transmission of the lower priority channel based on the overlap, wherein at least one of the higher priority channel and the lower priority channel is a positioning reference signal.

In an aspect, an apparatus for wireless communication includes means for detecting an overlap between an allocation of a first set of resources of a wireless communication link for transmission of a lower priority channel and an allocation of a second set of resources of the wireless communication link for transmission of a higher priority channel, means for removing a subset of resources from the allocation of the first set of resources to generate a removed subset of resources of the first set of resources and a remaining subset of resources of the first set of resources, and means for transmitting, to a receiver node, the lower priority channel on the remaining subset of resources, wherein the higher priority channel is transmitted on at least a portion of the removed subset of resources, wherein at least one of the higher priority channel and the lower priority channel is a positioning reference signal.

In an aspect, and apparatus for wireless communication includes means for receiving, from a serving cell of a base station, an allocation of a first set of resources of a wireless communication link for transmission of a lower priority channel to the serving cell, means for detecting an overlap between the first set of resources of the wireless communication link allocated for transmission of the lower priority channel and a second set of resources of the wireless communication link allocated for transmission of a higher priority channel, and means for rejecting, by the UE, the allocation of the first set of resources for transmission of the lower priority channel based on the overlap, wherein at least one of the higher priority channel and the lower priority channel is a positioning reference signal.

In an aspect, a non-transitory computer-readable medium storing computer-executable instructions includes computer-executable instructions comprising at least one instruction instructing a transmitter node to detect an overlap between an allocation of a first set of resources of a wireless communication link for transmission of a lower priority channel and an allocation of a second set of resources of the wireless communication link for transmission of a higher priority channel, at least one instruction instructing the transmitter node to remove a subset of resources from the allocation of the first set of resources to generate a removed subset of resources of the first set of resources and a remaining subset of resources of the first set of resources, and at least one instruction instructing the transmitter node to transmit, to a receiver node, the lower priority channel on the remaining subset of resources, wherein the higher priority channel is transmitted on at least a portion of the removed subset of resources, wherein at least one of the higher priority channel and the lower priority channel is a positioning reference signal.

In an aspect, a non-transitory computer-readable medium storing computer-executable instructions includes computer-executable instructions comprising at least one instruction instructing a UE to receive, from a serving cell of a base station, an allocation of a first set of resources of a wireless communication link for transmission of a lower priority channel to the serving cell, at least one instruction instructing the UE to detect an overlap between the first set of resources of the wireless communication link allocated for transmission of the lower priority channel and a second set of resources of the wireless communication link allocated for transmission of a higher priority channel, and at least one instruction instructing the UE to rejecting, by the UE, the allocation of the first set of resources for transmission of the lower priority channel based on the overlap, wherein at least one of the higher priority channel and the lower priority channel is a positioning reference signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
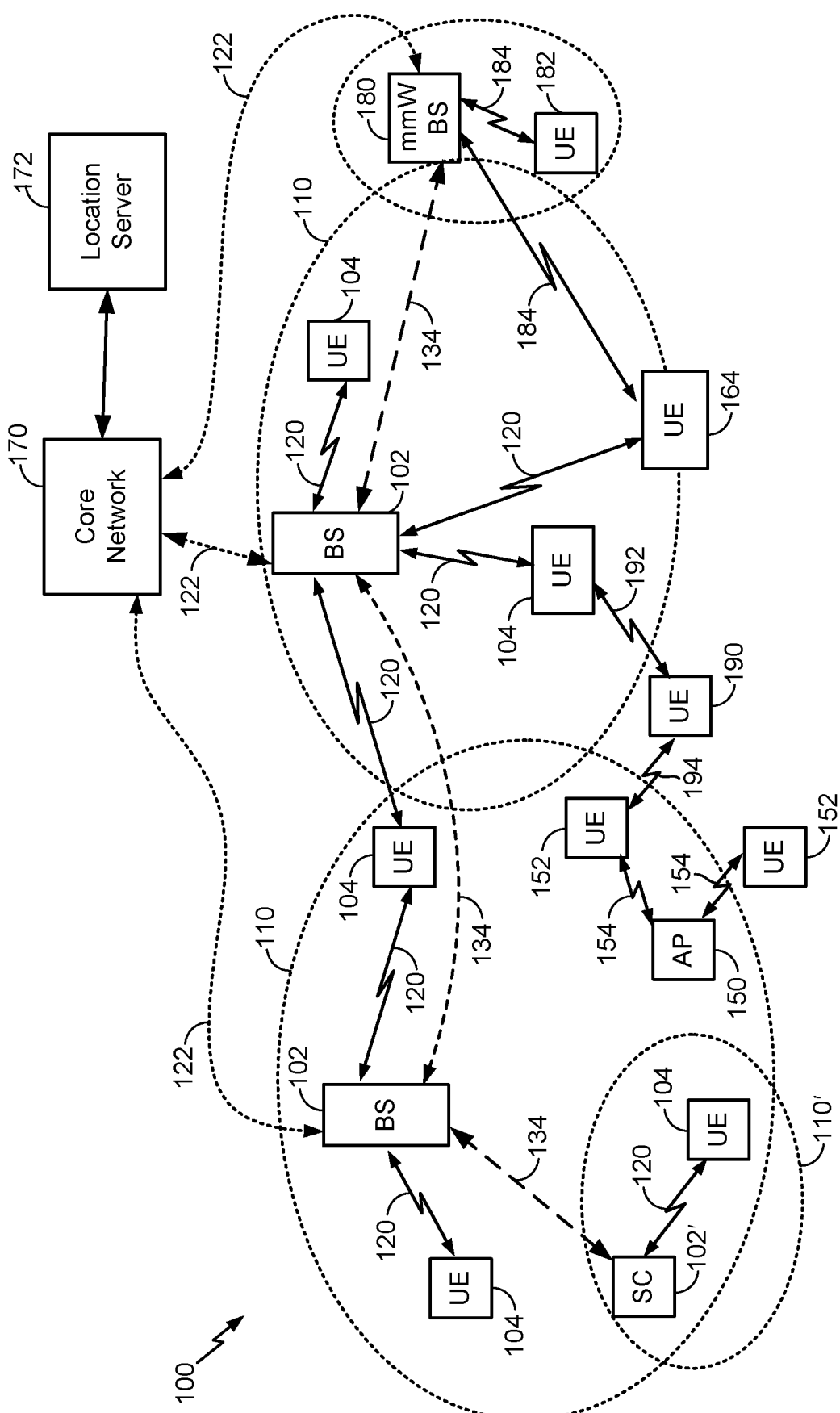
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), an NR Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
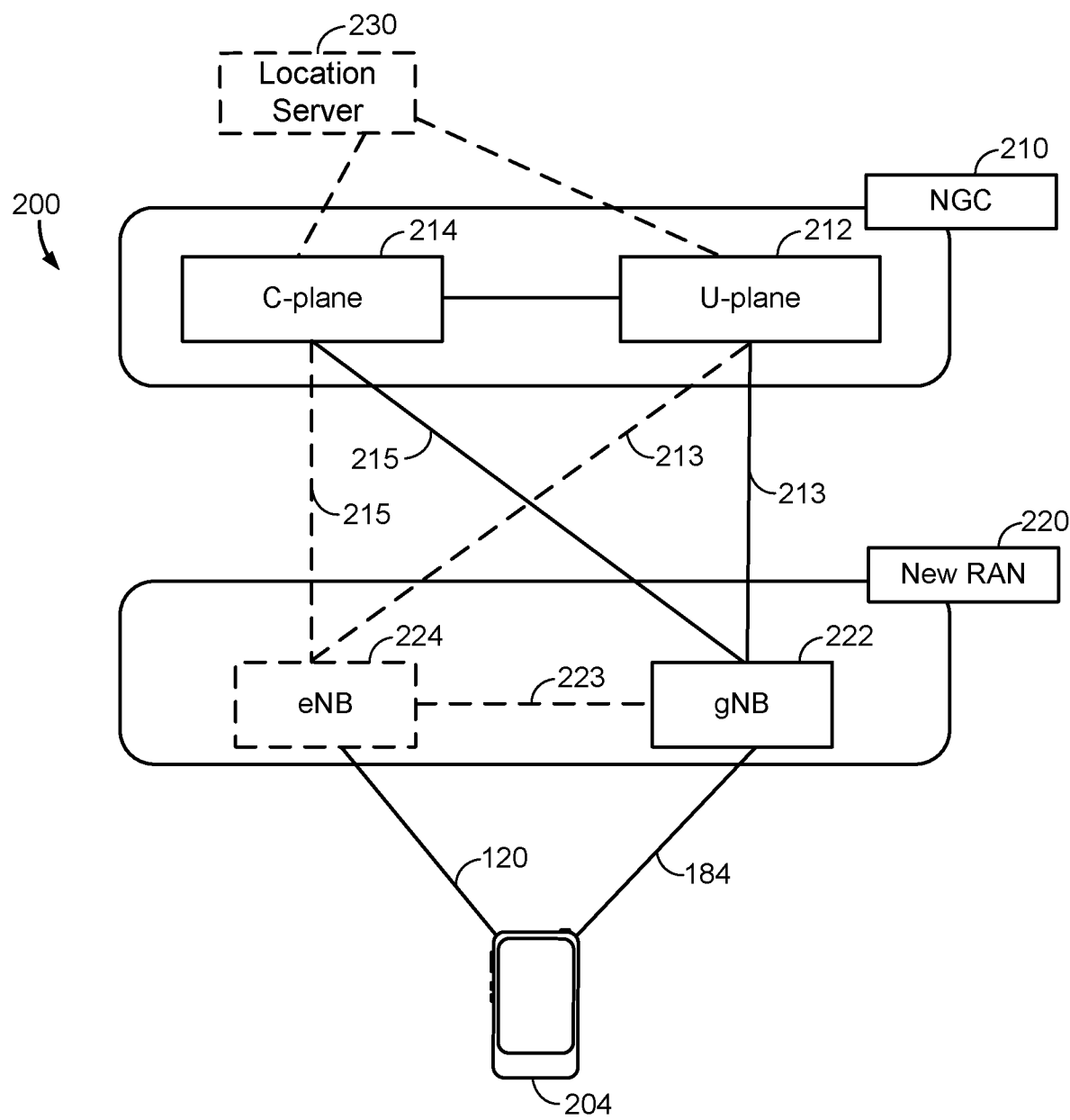
FIGS. 2A and 2B illustrate example wireless network structures, according to various aspects of the disclosure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
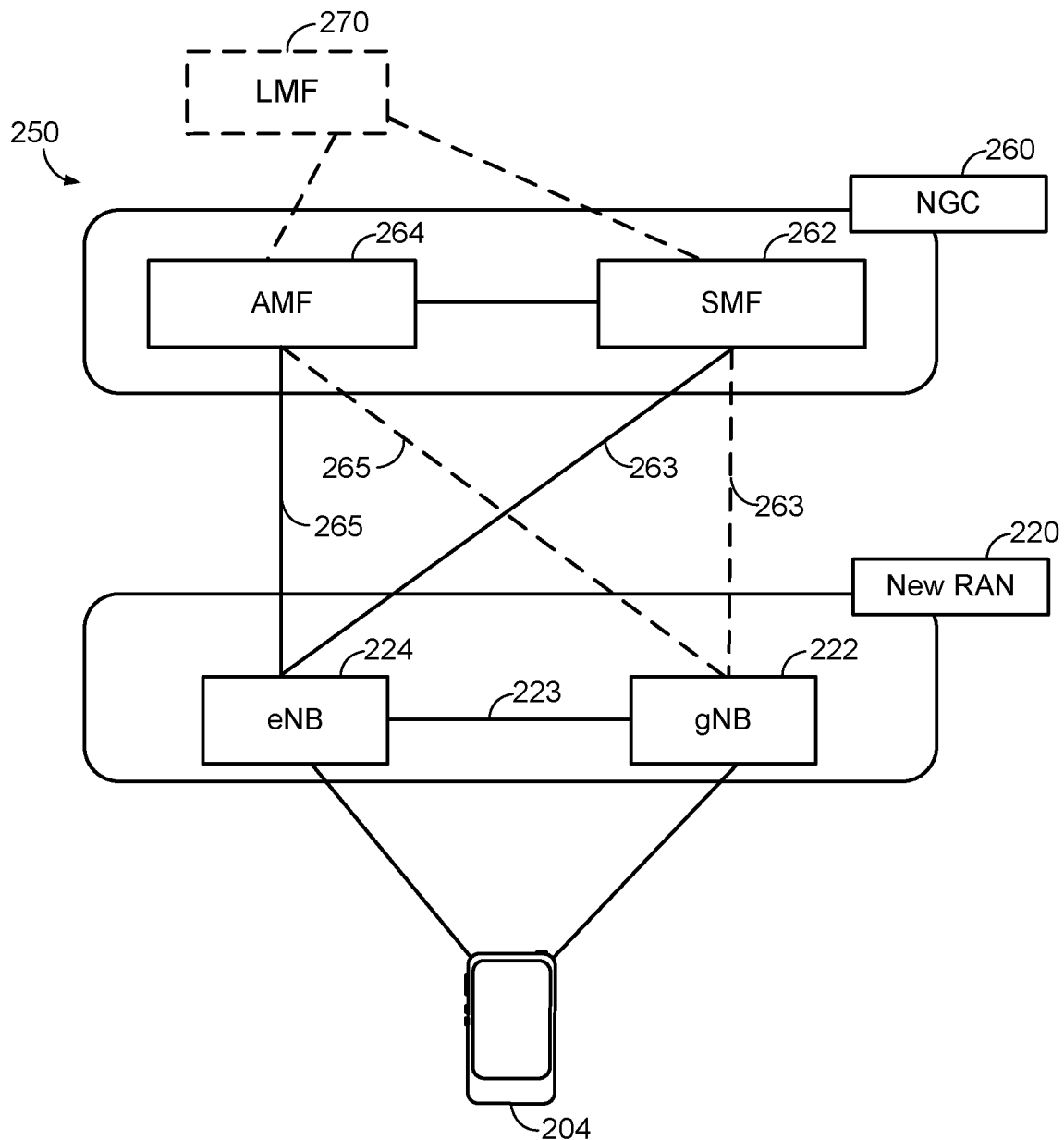

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
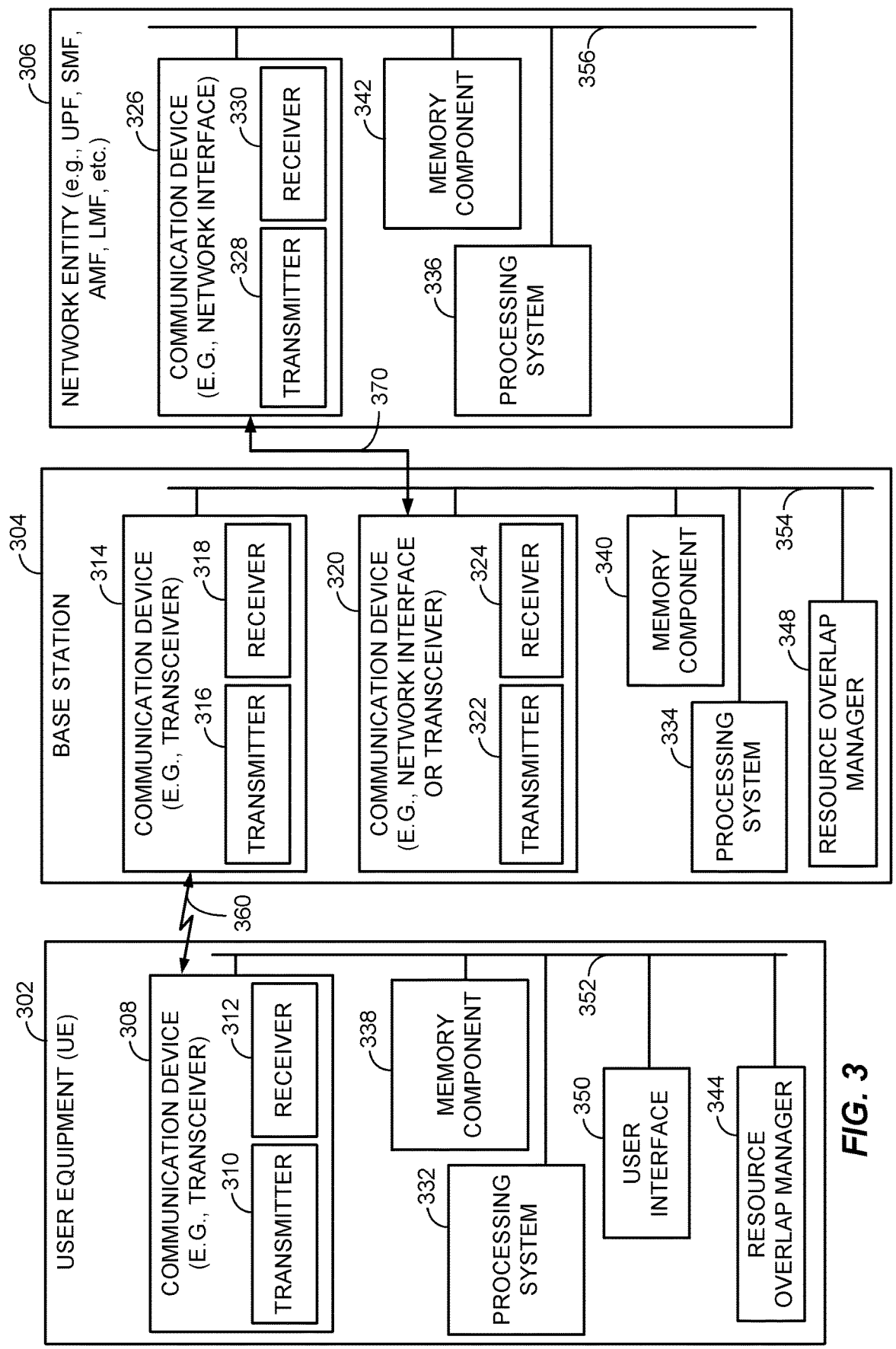
FIG. 3 illustrates exemplary apparatuses in an access network, according to various aspects of the disclosure.

FIG. 3 illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on).

A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302, 304, and 306 may include resource overlap managers 344 and 348 respectively. The resource overlap managers 344 and 348 may be hardware circuits that are part of or coupled to the processing systems 332 and 334, respectively, that, when executed, cause the apparatuses 302 and 304 to perform the functionality described herein. Alternatively, the resource overlap managers 344 and 348 may be memory modules stored in the memory components 338 and 340, respectively, that, when executed by the processing systems 332 and 334, cause the apparatuses 302 and 304 to perform the functionality described herein.

For convenience, the apparatuses 302, 304, and/or 306 are shown in FIG. 3 as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3 may be implemented in various ways. In some implementations, the components of FIG. 3 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, and 342 may be implemented by processor and memory component (s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the reporting managers 344 and 348, etc.

To support position estimates of a UE (e.g., any of the UEs described herein), a base station (e.g., any of the base stations described herein) may be configured to broadcast reference RF signals (e.g., positioning reference signals (PRS), navigation reference signals (NRS), tracking reference signals (TRS), cell-specific reference signals (CRS), channel state information reference signals (CSI-RS), phase tracking reference signal (PTRS), primary synchronization signals (PSS), secondary synchronization signals (SSS), etc.) to UEs in their coverage area to enable a UE to measure reference RF signal timing differences (e.g., observed time difference of arrival (OTDOA) or reference signal time difference (RSTD)) between pairs of network nodes. As used herein, a "network node" may be a base station, a cell of a base station, a remote radio head, an antenna of a base station (where the locations of the antennas of a base station are distinct from the location of the base station itself), or any other network entity capable of transmitting reference RF signals. Further, as used herein, a "node" may refer to either a network node or a UE.

A location server (e.g., location server 230, LMF 270) may send assistance data to the UE that includes an identification of one or more neighbor cells of base stations and configuration information for reference RF signals transmitted by each neighbor cell. Alternatively, the assistance data can originate directly from the base stations themselves (e.g., in periodically broadcasted overhead messages, etc.). Alternatively, the UE can detect neighbor cells of base stations itself without the use of assistance data. The UE (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) or antenna(s) that transmitted the reference RF signals that the UE measured), the UE or the location server can determine the distance between the UE and the measured network nodes and thereby calculate the location of the UE.

The term "position estimate" is used herein to refer to an estimate of a position for a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

Figure 4A:
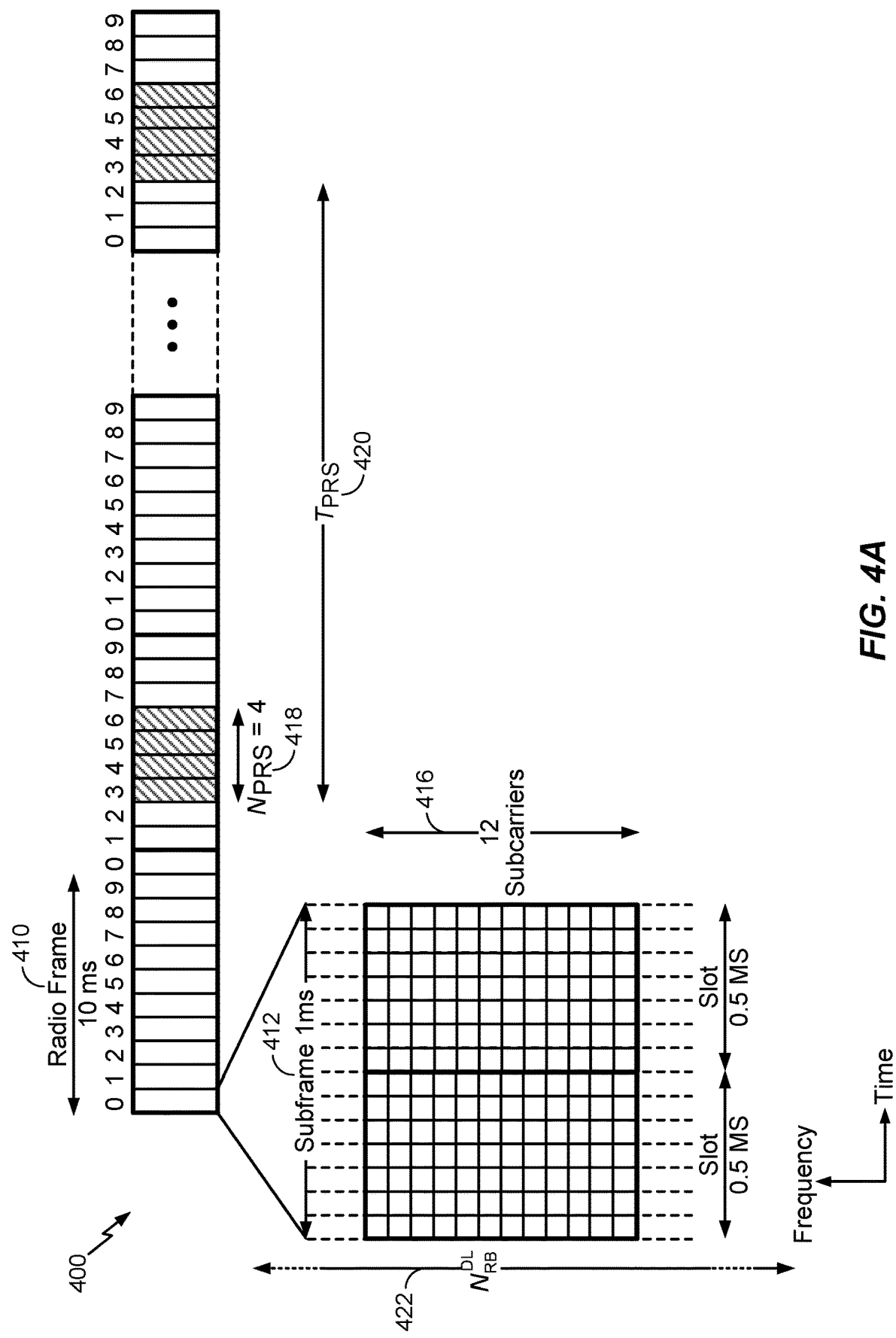
FIG. 4A is a diagram of a structure of an example subframe sequence with positioning reference signal (PRS) positioning occasions, according to various aspects of the disclosure.

Various frame structures may be used to support downlink and uplink transmissions between network nodes (e.g., base stations and UEs). FIG. 4A shows a structure of an example subframe sequence 400 with reference RF signal (specifically PRS) positioning occasions, according to various aspects of the disclosure. Subframe sequence 400 may be applicable to the broadcast of PRS signals from any of the base stations described herein. In FIG. 4A, time is represented horizontally (e.g., on an X axis) with time increasing from left to right, while frequency is represented vertically (e.g., on a Y axis) with frequency increasing (or decreasing) from bottom to top. As shown in FIG. 4A, in the time domain, downlink and uplink radio frames 410 may be of 10 milliseconds (ms) duration each. For downlink frequency division duplex (FDD) mode, radio frames 410 are organized, in the illustrated example, into ten subframes 412 of 1 ms duration each. Each subframe 412 comprises two consecutive slots 414, each of, for example, 0.5 ms duration. Each slot is further divided into some number (e.g., 7 in the example of FIG. 4A) of consecutive OFDM symbols.

In the frequency domain, the available bandwidth may be divided into uniformly spaced orthogonal subcarriers 416. For example, for a normal length cyclic prefix (CP) using, for example, 15 kHz spacing, subcarriers 416 may be grouped into a group of twelve (12) subcarriers. Each grouping of one slot 414 in the time domain and 12 subcarriers 416 in the frequency domain is termed a resource block (RB) and, in the example above, the number of subcarriers in the resource block may be written as $N_{SC}^{RB}=12$. For a given channel bandwidth, the number of available resource blocks on each channel 422, which is also called the transmission bandwidth configuration 422, is indicated as $N_{RB}^{DL}$. For example, for a 3 MHz channel bandwidth in the above example, the number of available resource blocks on each channel 422 is given by $N_{RB}^{DL}=15$. A resource of one OFDM symbol length in the time domain and one subcarrier in the frequency domain (represented as a block of a slot 414) is referred to as a resource element (RE).

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers 416, which are also commonly referred to as tones, bins, etc. Each subcarrier 416 may be modulated with data. In general, modulation symbols are sent in the frequency domain with OFDM and in the time domain with SC-FDM. The spacing between adjacent subcarriers 416 may be fixed, and the total number of subcarriers 416 (K) may be dependent on the system bandwidth. For example, the spacing of the subcarriers 416 may be 15 kHz and the minimum resource allocation (resource block) may be 12 subcarriers 416 (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz and 204 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (HS) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 204 | 14 | 16 | 160 | 0.0625 | 4.17 | 800 |

A base station, such as any of the base stations described herein, may transmit frames 410, or other physical layer signaling sequences, supporting PRS signals according to frame configurations either similar to, or the same as that, shown in FIG. 4A, which may be measured and used for a UE (e.g., any of the UEs described herein) position determination. Other types of wireless nodes and base stations may also be configured to transmit PRS signals configured in a manner similar to (or the same as) that depicted in FIG. 4A. Since transmission of a PRS by a wireless node or base station is directed to all UEs within radio range, a wireless node or base station can also be considered to transmit (or broadcast) a PRS.

A PRS may be transmitted by wireless nodes after appropriate configuration (e.g., by an Operations and Maintenance (O&M) server, location server 230, LMF 270). A PRS may be transmitted in special positioning subframes that are grouped into positioning occasions. For example, in LTE, a PRS positioning occasion can comprise a number $N_{PRS}$ of consecutive positioning subframes, where the number $N_{PRS}$ may be between 1 and 160 (e.g., may include the values 1, 2, 4, and 6 as well as other values). The PRS positioning occasions for a cell supported by a wireless node may occur periodically at intervals, denoted by a number $T_{PRS}$, of millisecond (or subframe) intervals where $T_{PRS}$ may equal 5, 10, 20, 40, 80, 160, 320, 640, or 1280 (or any other appropriate value). As an example, FIG. 4A illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions.

A collection of resource elements that are used for transmission of PRS is referred to as a "PRS resource." The collection of resource elements can span multiple PRBs in the frequency domain and N (e.g., 1 or more) consecutive symbol(s) 460 within a slot 430 in the time domain. In a given OFDM symbol 460, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth sub carrier of a given symbol carries PRS.

A "PRS resource set" is a set of PRS resources used for the transmission of PRS signals, where each PRS resource has a PRS resource ID. In addition, the PRS resources in a PRS resource set are associated with the same transmission-reception point (TRP). A PRS resource set is identified by a PRS resource set ID and may be associated with a particular TRP (identified by a cell ID) transmitted by an antenna panel of a base station. A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS occasion" is one instance of a periodically repeated time window (e.g., a group of one or more consecutive slots) where PRS are expected to be transmitted. A PRS occasion may also be referred to as a "PRS positioning occasion," a "positioning occasion," or simply an "occasion."

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS in 5G, TRS, CRS, CSI-RS, PSS, SSS, etc.

Figure 4B:
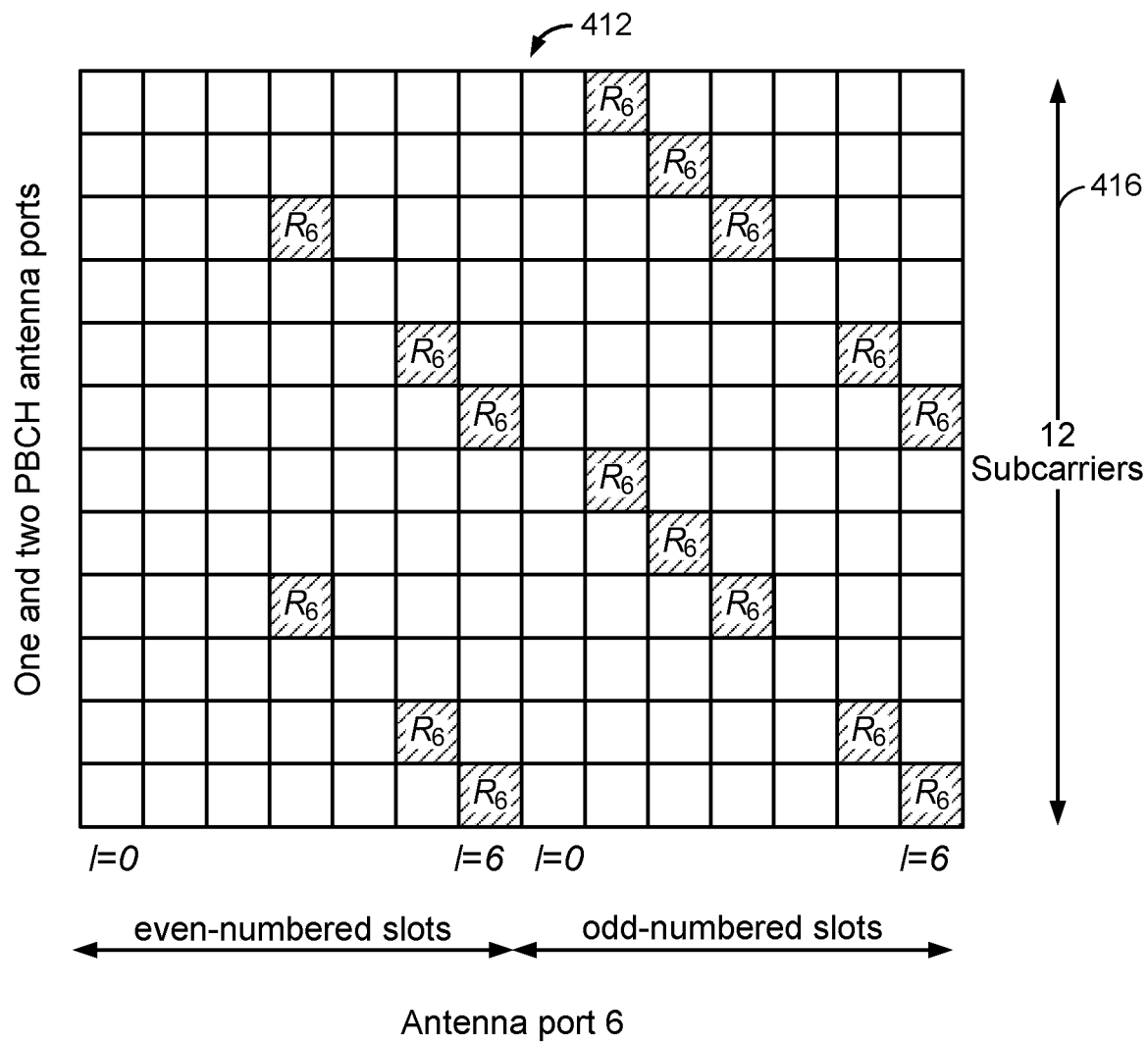
FIG. 4B is a diagram of an exemplary mapping of PRS to resource elements, according to various aspects of the disclosure.

An exemplary mapping of PRS to REs is shown in FIG. 4B for normal cyclic prefix and one-or-two transmit antenna ports. FIG. 4B illustrates the subframe 412 of 12 subcarriers over 14 OFDM symbols. Each block in FIG. 4B indicates a RE with frequency-domain index k and time-domain index 1. The blocks labeled "$R_6$" within the subframe 412 indicate PRS REs.

Figure 5A:
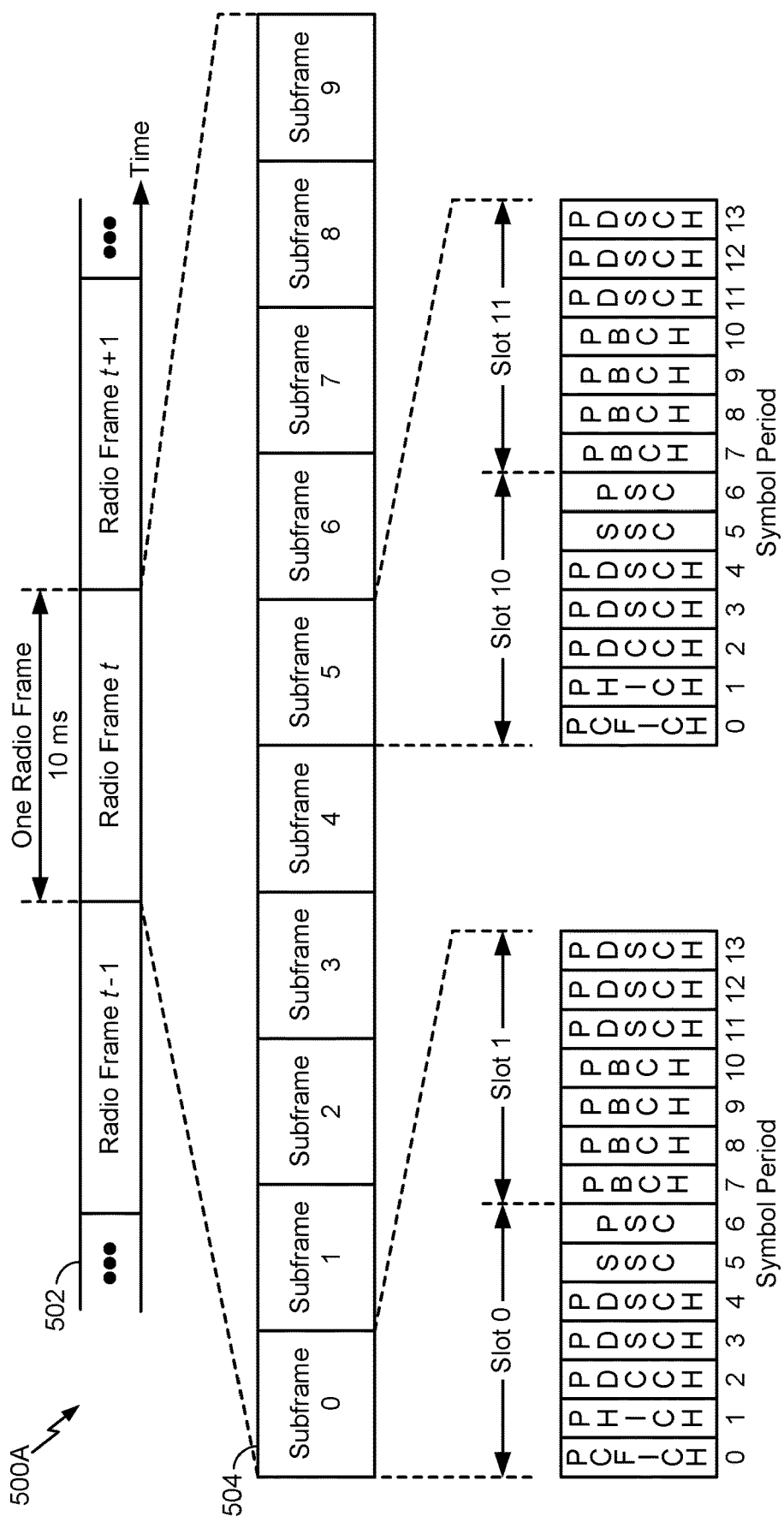
FIG. 5A is a diagram illustrating an example of a downlink frame structure in a wireless telecommunications system, according to various aspects of the disclosure.

FIG. 5A shows an exemplary downlink frame structure 500A, according to an aspect of the disclosure. The transmission timeline for the downlink may be partitioned into units of radio frames 502 (which may correspond to radio frame 410 in FIG. 4A). Each radio frame 502 may have a predetermined duration (e.g., 10 ms) and may be partitioned into 10 subframes 504 (which may correspond to subframes 412 in FIG. 4A) with indices of 0 through 9. Each subframe may include two slots (which may correspond to slots 414 in FIG. 4A). Each radio frame 502 may thus include 20 slots with indices of 0 through 19. Each slot may include L symbol periods, for example, 7 symbol periods for a normal cyclic prefix (as shown in FIG. 5A) or 14 symbol periods for an extended cyclic prefix. The 2L symbol periods in each subframe may be assigned indices of 0 through 2L−1. The available time-frequency resources may be partitioned into resource blocks. Each resource block may cover N subcarriers (e.g., 12 subcarriers) in one slot.

A base station may send a PSS and an SSS for each cell supported by the base station. The primary and secondary synchronization signals may be sent in symbol periods 6 and 5, respectively, in each of subframes 0 and 5 of each radio frame with the normal cyclic prefix, as shown in FIG. 5A. The synchronization signals may be used by UEs for cell detection and acquisition. The base station may send a physical broadcast channel (PBCH) in symbol periods 0 to 3 in slot 1 of subframe 0. The PBCH may carry certain system information.

The base station may send a physical control format indicator channel (PCFICH) in only a portion of the first symbol period of each subframe, although depicted in the entire first symbol period in FIG. 5A. The PCFICH may convey the number of symbol periods (M) used for control channels, where M may be equal to 1, 2 or 3 and may change from subframe to subframe. M may also be equal to 4 for a small system bandwidth, for example, with less than 10 resource blocks. In the example shown in FIG. 5A, M=3. The base station may send a physical HARQ indicator channel (PHICH) and a physical downlink control channel (PDCCH) in the first M symbol periods of each subframe (M=3 in FIG. 5A). The PHICH may carry information to support HARQ. The PDCCH may carry information on uplink and downlink resource allocation for UEs and power control information for uplink channels. Although not shown in the first symbol period in FIG. 5A, it is understood that the PDCCH and PHICH are also included in the first symbol period. Similarly, the PHICH and PDCCH are also both in the second and third symbol periods, although not shown that way in FIG. 5A. The base station may send a physical downlink shared channel (PDSCH) in the remaining symbol periods of each subframe. The PDSCH may carry data for UEs scheduled for data transmission on the downlink.

The base station may send the PSS, SSS, and PBCH in the center (e.g., 1.08 MHz) of the system bandwidth used by the base station. The base station may send the PCFICH and PHICH across the entire system bandwidth in each symbol period in which these channels are sent. The base station may send the PDCCH to groups of UEs in certain portions of the system bandwidth. The base station may send the PDSCH to specific UEs in specific portions of the system bandwidth. The base station may send the PSS, SSS, PBCH, PCFICH, and PHICH in a broadcast manner to all UEs, may send the PDCCH in a unicast manner to specific UEs, and may also send the PDSCH in a unicast manner to specific UEs.

A single instance of a downlink physical channel (e.g., PDCCH, PDSCH) may be sent over multiple slots (which is permitted for certain channels by certain standards), or multiple instances of the downlink physical channel may be sent over multiple slots (e.g., two different packets on two different PDSCHs, or one packet and its HARQ retransmission).

A number of resource elements (REs) may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A base station may send the PDCCH to the UE in any of the combinations that the UE will search.

Figure 5B:
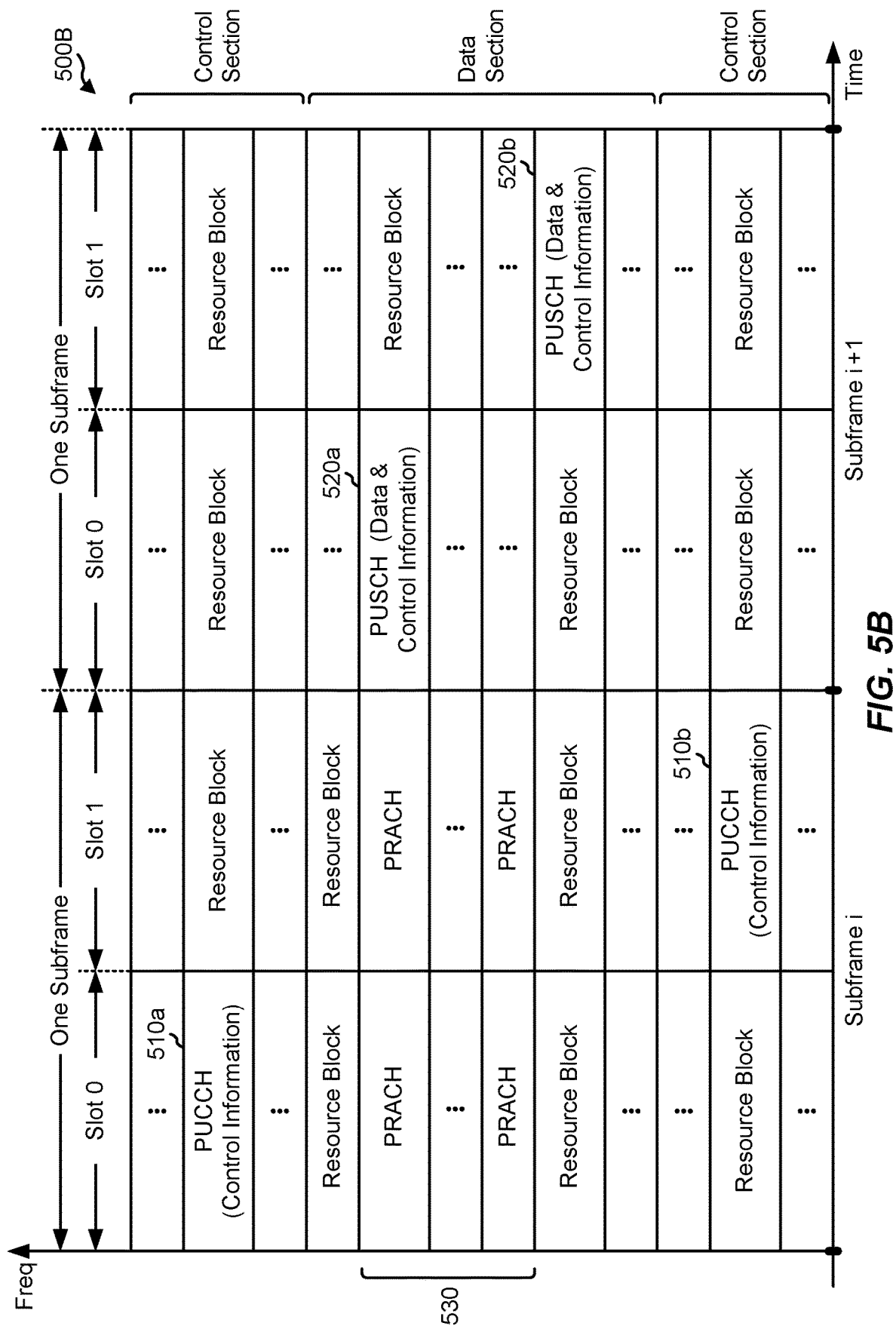
FIG. 5B is a diagram illustrating an example of an uplink frame structure in a wireless telecommunications system, according to various aspects of the disclosure.

FIG. 5B illustrates an exemplary uplink frame structure 500B, according to various aspects of the disclosure. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5B results in the data section including contiguous subcarriers, which may allow a single UE to be assigned all of the contiguous subcarriers in the data section.

A UE (e.g., any of the UEs described herein) may be assigned resource blocks 510a, 510b in the control section to transmit control information to a base station (e.g., any of the base stations described herein). The UE may also be assigned resource blocks 520a, 520b in the data section to transmit data to the base station. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency as shown in FIG. 5B.

As shown in FIG. 5B, a set of resource blocks may be used to perform initial system access and achieve uplink synchronization in a physical random access channel (PRACH) 530. The PRACH 530 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., 1 ms) and a UE can make only a single PRACH attempt per frame (e.g., 10 ms).

In certain legacy LTE standards, PRS are transmitted on "dedicated" downlink resources that are not frequency-division multiplexed (FDM'ed) with any other channels or signals. In NR, however, there is greater flexibility regarding the interaction of PRS and other data. For example, rather than a set of time/frequency resources being allocated solely to uplink and/or downlink PRS transmission, as in LTE, in NR, the set of resources allocated to PRS transmissions may be the same as, or overlap with, a set of resources allocated to a different type of signal (which may be, for example, an intra-cell or neighbor cell transmission). In the case of such an overlap, the higher priority signal takes precedent, and the lower priority signal may be "punctured" to allow the higher priority signal to use the resources otherwise allocated to the lower priority signal. More specifically, a subset of the set of resources (e.g., OFDM symbols, resource elements, slots, and/or resource blocks) allocated to the lower priority signal is punctured, and the punctured subset of the set of resources is used for the higher priority signal. In that way, the higher priority signal is transmitted as if there were no overlap with the lower priority signal. The remaining non-punctured subset of the set of resources is used for the lower priority signal.

In an aspect, the relative priorities between the priority of a first type of signal and a second type of signal can be absolute, such that certain signal types always have higher priority than other signal types. However, the relative priority can also be conditional or contextual, such that the first type of signal has a higher priority than the second type of signal in some situations, and a lower priority in other situations. For example, if the first type of signal is a periodically transmitted signal and the second type of signal is an aperiodically transmitted signal, the second type of signal may have a higher priority than the first type of signal.

In some cases, a PRS transmission may be the lower priority signal, and in other cases, a PRS transmission may be the higher priority signal. A PRS transmission may have a higher priority in situations where, for example, it is not transmitted at regular intervals (aperiodic) and the other signal is, or where it is transmitted at regular intervals but the other signal is transmitted at more frequent intervals. For example, where a PRS resource assignment overlaps with the resource assignment for another physical channel (e.g., PDCCH, PDSCH, SSB, or CSI-RS on the downlink, and PUCCH, PUSCH, uplink PRS, or SRS on the uplink), the PRS transmission may be the higher priority signal and should not be punctured. A PRS transmission not being punctured means that the PRS should be transmitted as if there were no overlap with the lower priority signal.

An overlap between a higher priority channel (e.g., a PRS transmission) and a lower priority channel (e.g., a physical channel) may be an overlap in both time and frequency resources or an overlap in time resource only. An overlap in time resources only may be treated as an overlap for rate-matching purposes in cases where transmissions of the higher priority channel are considered to be of sufficient priority that all available transmit power should be used for the higher priority channel. For example, in the uplink, frequency-division multiplexing (FDM) waveforms on non-contiguous bandwidths could give rise to intermodulation artifacts during transmission, which could necessitate a reduction in transmit power (e.g., maximum power reduction (MPR)) so as to limit the power and thus the harmful effects of these artifacts. FDM of low peak to average power ratio (PAPR) waveforms could cause increase in PAPR, which could also necessitate applying further MPR. To avoid these power reductions, it may be desirable to avoid the overlap of time resources even though they do not overlap in frequency. Such considerations may apply on the downlink as well, especially in scenarios where downlink transmit power is important, such as in high frequency (e.g., greater than 52.6 GHz) communication.

In another aspect, even an overlap in both time and frequency may be processed without any special rules involving suppression of one or the other transmission. That is, both the higher priority channel and the lower priority channel may be transmitted on the same time-frequency resource(s) but on different spatial streams (i.e., using MIMO transmission), or on the same time-frequency resource(s) and spatial stream using superposition transmission where the overlapping waveforms are simply added together. However, these approaches may require high SNR to allow for decoding of one or both of these transmissions while overcoming the interference caused by the other superposed transmission. Hence, alternative means of handling these overlaps are desirable in many scenarios.

Note that PRS may be transmitted by a serving cell or one or more neighbor cells. Additionally, the physical PRS waveform may be identical to, or a reuse of, another channel (e.g., CSI-RS or SSB may be used as a downlink PRS), or may be a newly defined waveform (e.g., a new Zadoff-Chu sequence for downlink PRS, or a new comb density not supported by existing CSI-RS). PRS may also be used for different positioning methods (e.g., OTDOA, uplink time difference of arrival (UTDOA), round-trip-time (RTT), angle-of-arrival (AoA), enhanced cell ID (E-CID), etc.). Thus, as used herein, the term "PRS" may refer to any type of reference signal that can be used for different types of positioning methods.

There are two options to handle an overlap between a set of resources allocated for PRS transmission and a set of resources allocated for an uplink or downlink physical channel (e.g., PDCCH, PDSCH, SSB, CSI-RS, PUCCH, PUSCH, SRS, TRS, etc.) where the PRS transmission has a higher priority than the physical channel. The first is to "forbid" the overlap, and the second is to perform a rate-matching or puncturing of the resources (e.g., OFDM symbols, resource elements, slots, resource blocks, etc.) allocated to the physical channel.

Referring to the first option, where resources are allocated for PRS, and the same or overlapping resources are allocated for uplink or downlink transmissions on a physical channel (e.g., PDSCH, PUSCH), the UE can treat the grant of the resources for the physical channel as an invalid grant. For semi-persistent scheduling (SPS) resource assignments (where the base station assigns predefined periodically repeating radio resources to the UE, eliminating the need for the UE to request those resources or for the base station to dynamically schedule those resources (for uplink grants, both may be needed, but for downlink grants, no UE request may be needed), thereby reducing overhead), the UE can treat the grant for the physical channel as an invalid grant for all scheduled instances of the resources for the physical channel or only overlapping instances. That is, even if only some scheduled instances of resources allocated for the physical channel overlap with the resources allocated for PRS, the entire physical channel grant may be treated as an invalid grant. Alternatively, only the scheduled instances of resources allocated for the physical channel that overlap with the resources allocated for PRS may be treated as an invalid grant. As would be appreciated, such a technique can be extended to other physical channels or signals with periodic or semi-persistent resource allocations as well, such as CSI-RS, SRS, SSB, and the like.

Still referring to the first option, if the lower priority physical channel is the PDCCH, the grant for only overlapping candidates, or entire search-spaces containing any overlapping candidates, can be treated as an invalid grant. More specifically, in the PDCCH region of a downlink slot, there may be multiple radio resource locations where a specific PDCCH is located, and the UE needs to search all of these possible locations. The set of possible locations for the PDCCH is referred to as the "search space," and each of the possible locations within the search space is referred to as a "PDCCH candidate." Thus, where resources are allocated for PRS, and the same or overlapping resources are allocated as one or more candidates of one or more search spaces for downlink transmissions on the PDCCH, only those candidate resources that overlap the resources allocated for PRS, or the entire search-space containing an overlapping candidate, can be treated as invalid. That is, the UE need not blindly decode those candidates in order to determine whether a PDCCH was transmitted in those resources. The choice of whether to reject the grant of only overlapping candidates or the entire search space containing an overlapping candidate may be specific to the search space, and may apply to all search spaces or only particular search spaces.

Still referring to the first option, in some cases, rather than treating the other channel grant as invalid, the PRS grant (configuration) may instead be treated as invalid. For example, if the other channel is an SSB or is granted on a periodic/semi-persistent (P/SP) basis, and/or the PRS configuration is dynamic/aperiodic rather than granted on a P/SP basis, then the PRS configuration may be treated as invalid.

In an aspect, the UE may treat an invalid grant as an error event (in which case the UE's behavior may be undefined), or the UE may discard the grant (which is a defined behavior).

Referring to the second option, in which one of rate-matching or puncturing of the resources allocated to the lower priority channel (e.g., a physical channel) is performed in the case of an overlap with a higher priority channel (e.g., a PRS transmission), the choice of which to perform may vary depending on the type of physical channel being punctured. For example, for reference signals (e.g., CSI-RS, SRS, SSB, etc.), puncturing may be chosen, whereas for data (e.g., PDSCH, PUSCH, etc.), rate-matching may be chosen. In an aspect, the choice of which to perform may be specified in the relevant standard.

Note that when puncturing of the lower priority channel (e.g., physical channel) is performed, the resources allocated to the lower priority channel are first assigned modulation symbols just as if no puncturing would be performed, and then the modulation symbols belonging to the resources to be punctured are replaced by other modulation symbols from the other channel to be transmitted, which in this case, is the higher priority channel (e.g., PRS). Thus, with puncturing, all resources allocated for the lower priority channel are populated with modulated signals as if there will be no puncturing, and then certain resources are replaced with modulated signals for the higher priority channel. On the other hand, when rate-matching is performed, the encoding process that finally generates the modulation symbols to be mapped to the assigned resources is instructed to generate only as many modulation symbols as needed to map to the assigned resources after having excluded the resources to be rate-matched around. Thus, with rate matching, the resources that will not be used for transmission of the lower priority channel do not have modulation symbols mapped to them.

Referring to the second option, rate matching may be performed by grant modification. For example, the base station can override the start and length indication value (SLIV) indicator in the grant (time-domain allocation) for the lower priority channel to exclude resources (e.g., OFDM symbols, slots, resource elements, resource blocks) containing the higher priority channel (e.g., PRS). The SLIV indicates the starting symbol "S" relative to the start of the slot and the number of consecutive symbols "L" counting from the symbol "S." It is used for time domain allocation for the PDSCH and PUSCH.

As another example of grant modification, the slot indication (e.g., k0 for the downlink or k2 for the uplink) identifying the slot to be used for the lower priority channel (e.g., a physical channel) can be overridden and the next available slot that does not contain the higher priority channel (e.g., a PRS) can be used for the lower priority channel instead. There does not need to be multiple slot grants in order to override the slot indication for the lower priority channel; one slot grant is enough. More specifically, the base station may allocate a plurality of sequential slots for the lower priority channel, and some or all of these slots may overlap with a higher priority channel transmission. In that case, the plurality of sequential slots allocated for the lower priority channel is moved to the next available sequence of slots that do not include a higher priority channel (e.g., PRS) transmission. This may be done by delaying only the overlapping slots and all slots following them (thereby changing the relative gaps between the slots), or by shifting the full set of slots preserving the relative gaps between them until they all avoid the overlap with the higher priority channel. Similarly, for a one slot grant for the lower priority channel, the lower priority channel data to be transmitted in the one slot is simply moved to the next slot after the granted slot that does not cause an overlap with the higher priority channel.

Continuing to refer to the second option, rate matching may be performed by a "rate-matching resource indication" provided to the UE. NR allows flexible time-frequency resource configurations as rate-matching resources (to be avoided by other channels). Time-frequency resources are explicitly specified, or specified via another configuration. For example, if the resources are occupied by LTE CRS, the base station can indicate the CRS configuration to the UE.

In the case of rate matching around PRS, the base station can indicate the PRS configuration to be rate-matched around, similar to rate-matching around LTE CRS. This configuration may be partly implicit and partly explicit. For example, an implicit configuration would be that the serving cell PRS is always part of the configuration, while an explicit configuration could be that a neighbor cell PRS is explicitly configured.

In an aspect, if the entire lower priority channel (e.g., physical channel) grant is punctured out, it may be regarded as equivalent to the first option.

The choice between the first and second options may depend on multiple factors, such as the type of the other channel (e.g., SSB, CSI-RS, whether uplink or downlink, etc.), whether the PRS transmission and/or the other channel are aperiodic, periodic, semi-persistent, and/or unicast, multicast, or broadcast, and the priority levels of the PRS transmission and the other channel.

In addition, there may be multiple PRS configured (e.g., a broadcast and a unicast one), and each may follow a different set of rules. That is, for example, some PRS may override another channel, while it may not override a different channel. For example, channels supporting ultra-reliable low latency communications (URLLC) traffic may have higher priority than PRS, whereas those supporting enhanced mobile broadband (eMBB) may have lower priority than PRS. Further, the "other channel" may itself be another PRS. That is, the techniques described herein can also apply to the case of two PRS configurations with overlapping assignments. For example, an aperiodic PRS configuration may override a periodic/semi-persistent PRS configuration.

Figure 6:
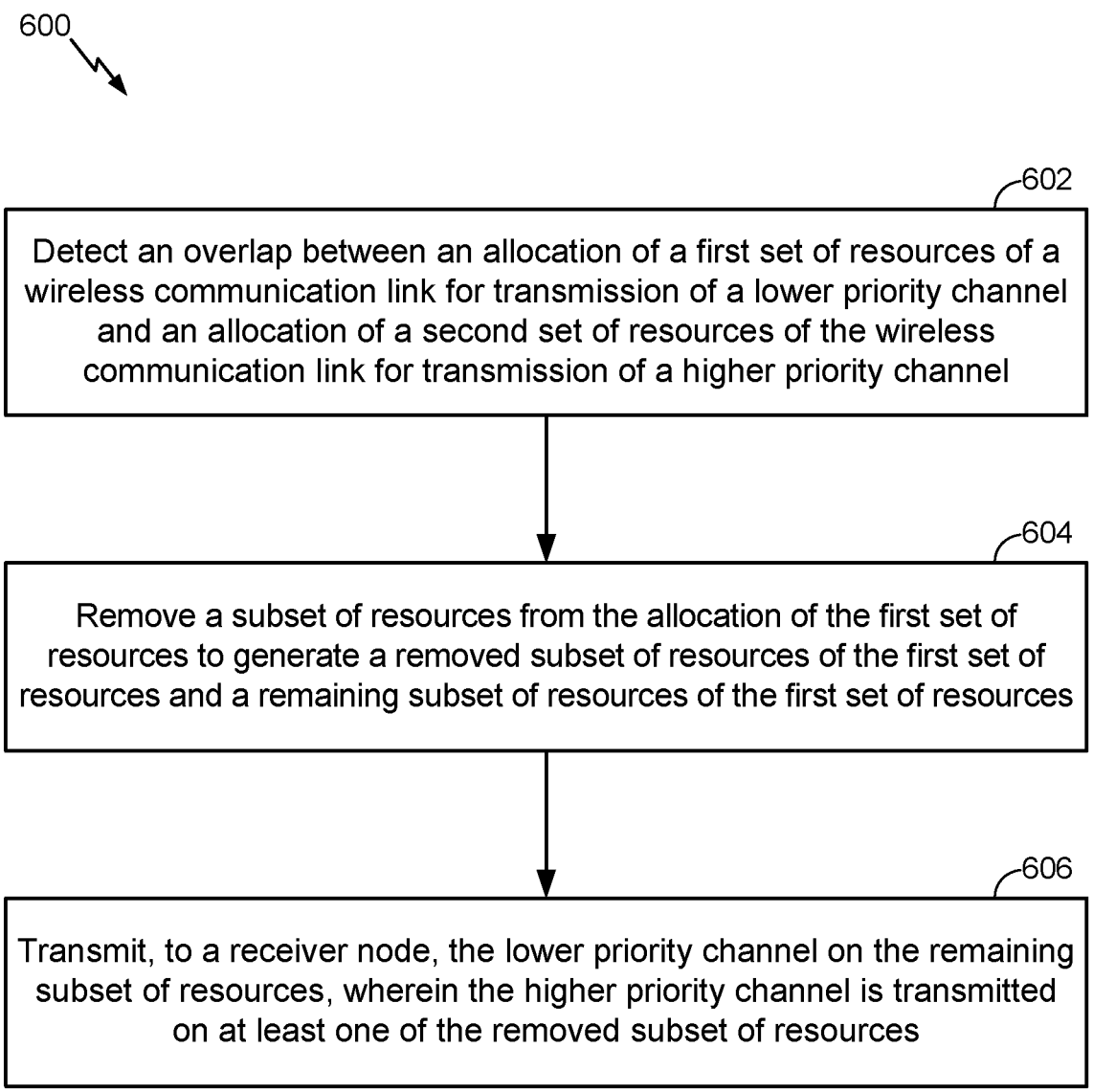
FIGS. 6 and 7 illustrate exemplary methods of handling an overlap between resources allocated for a positioning reference signal transmission and resources allocated for a physical channel, according to various aspects of the disclosure.

FIG. 6 illustrates an exemplary method 600 of handling an overlap between resources allocated for a higher priority channel and resources allocated for a lower priority channel, according to an aspect of the disclosure. The method 600 may be performed by a transmitter node, which may be a UE (e.g., any of the UEs described herein) or a serving cell of a base station (e.g., any of the base stations described herein).

At 602, the transmitter node detects an overlap between an allocation of a first set of resources (e.g., OFDM symbols, slots, resource elements, resource blocks, or any combination thereof of one or more radio frames) of a wireless communication link (e.g., communication link 120, 184) for transmission of the lower priority channel (e.g., a physical downlink or uplink channel) and an allocation of a second set of resources (e.g., OFDM symbols, slots, resource elements, resource blocks, or any combination thereof of the one or more radio frames) of the wireless communication link for transmission of the higher priority channel (e.g., a downlink or uplink PRS). In an aspect, operation 602 may be performed by communication device 308, processing system 332, memory component 338, and/or resource overlap manager 344, any or all of which may be considered means for performing this operation. Alternatively, operation 602 may be performed by communication device 314, processing system 334, memory component 340, and/or resource overlap manager 348, any or all of which may be considered means for performing this operation.

At 604, the transmitter node removes a subset of resources from the allocation of the first set of resources to generate a removed subset of resources of the first set of resources and a remaining subset of resources of the first set of resources. In an aspect, operation 604 may be performed by communication device 308, processing system 332, memory component 338, and/or resource overlap manager 344, any or all of which may be considered means for performing this operation. Alternatively, operation 604 may be performed by communication device 314, processing system 334, memory component 340, and/or resource overlap manager 348, any or all of which may be considered means for performing this operation.

At 606, the transmitter node transmits, to a receiver node (e.g., any of the UEs described herein or any of the base stations described herein), the lower priority channel on the remaining subset of resources of the first set of resources. In an aspect, the higher priority channel is transmitted on at least a portion of the removed subset of resources of the first set of resources. The higher priority channel may be transmitted by the transmitter node (where the transmitter node is a serving cell) or a neighboring cell of the transmitter node. In an aspect, operation 606 may be performed by communication device 308, processing system 332, memory component 338, and/or resource overlap manager 344, any or all of which may be considered means for performing this operation. Alternatively, operation 606 may be performed by communication device 314, processing system 334, memory component 340, and/or resource overlap manager 348, any or all of which may be considered means for performing this operation.

Figure 7:
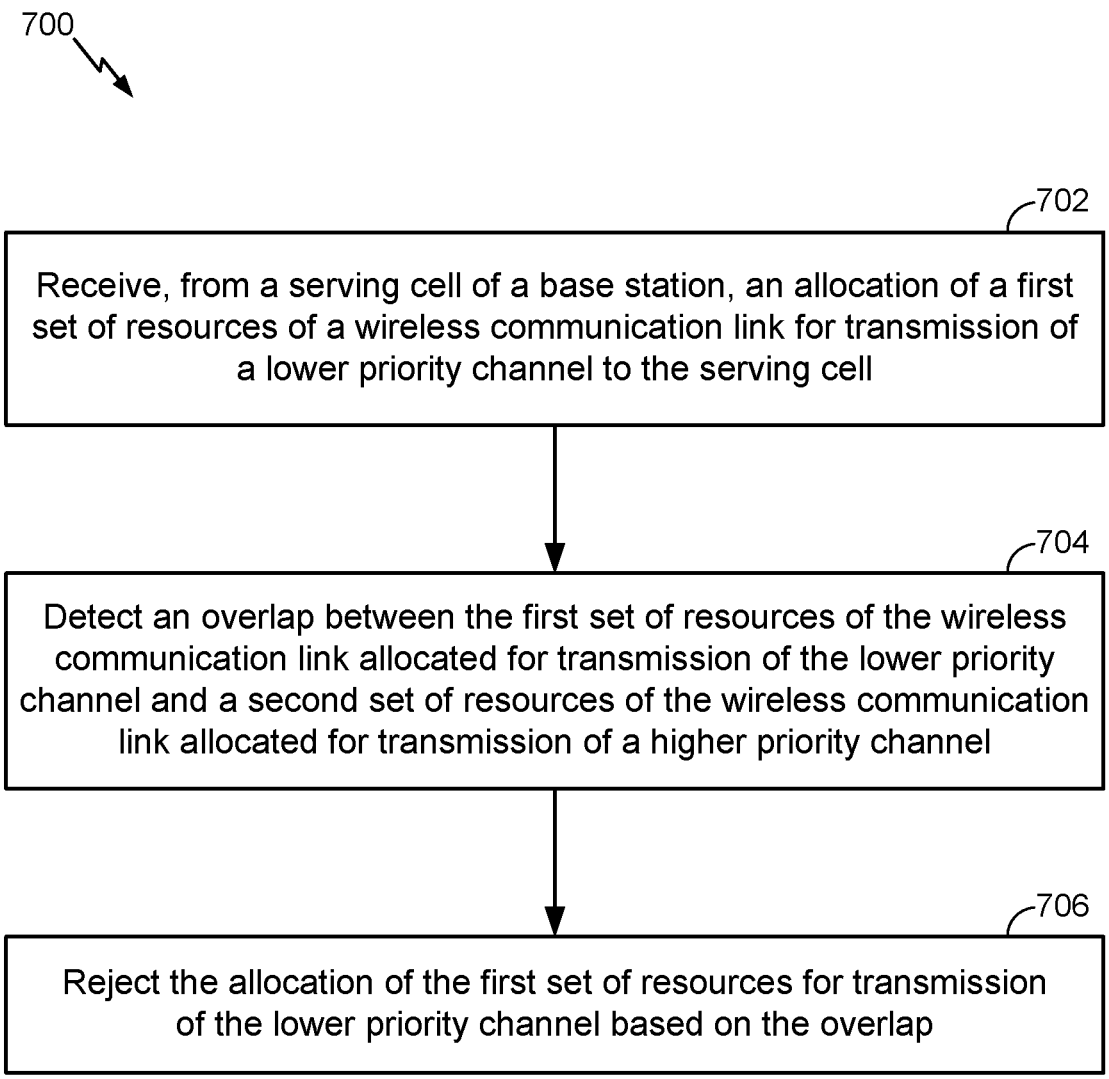

FIG. 7 illustrates an exemplary method 700 of handling an overlap between resources allocated for a higher priority channel and resources allocated for a lower priority channel, according to an aspect of the disclosure. The method 700 may be performed by a UE (e.g., any of the UEs described herein).

At 702, the UE receives, from a serving cell of a base station (e.g., any of the base stations described herein), an allocation of a first set of resources (e.g., OFDM symbols, slots, resource elements, resource blocks, or any combination thereof of one or more radio frames) of a wireless communication link (e.g., communication link 120, 184) for transmission of a lower priority channel (e.g., a physical uplink channel) to the serving cell. In an aspect, operation 702 may be performed by communication device 308, processing system 332, memory component 338, and/or resource overlap manager 344, any or all of which may be considered means for performing this operation.

At 704, the UE detects an overlap between the first set of resources of the wireless communication link allocated for transmission of the lower priority channel and a second set of resources (e.g., OFDM symbols, slots, resource elements, resource blocks, or any combination thereof of one or more radio frames) of the wireless communication link allocated for transmission of the higher priority channel (e.g., an SRS or uplink PRS). In an aspect, operation 704 may be performed by communication device 308, processing system 332, memory component 338, and/or resource overlap manager 344, any or all of which may be considered means for performing this operation.

At 706, the UE rejects the allocation (grant) of the first set of resources for transmission of the lower priority channel based on the overlap. The UE may send a notification to the serving cell that it has rejected the allocation, and the serving cell may send a new allocation. The UE may send the rejection with or without specifying the reason for the rejection (e.g., it may or may not indicate that the rejection is because of an "overlap"). In some cases, the UE may propose a different allocation to the serving cell. In an aspect, operation 706 may be performed by communication device 308, processing system 332, memory component 338, and/or resource overlap manager 344, any or all of which may be considered means for performing this operation.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying a method for managing an overlap between a set of resources allocated to a positioning reference signal and a set of resources allocated to a physical channel.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a user equipment (UE), comprising:
   detecting an overlap between an allocation of a first set of resources of a wireless communication link for transmission of a lower priority channel and an allocation of a second set of resources of the wireless communication link for transmission of a higher priority channel;
   removing a subset of resources from the allocation of the first set of resources to generate a removed subset of resources of the first set of resources and a remaining subset of resources of the first set of resources; and
   transmitting, to a cell of a base station, the lower priority channel on the remaining subset of resources, wherein the higher priority channel is transmitted on at least a portion of the removed subset of resources,
   wherein the higher priority channel is a physical uplink shared channel (PUSCH) and the lower priority channel is a sounding reference signal (SRS) for positioning.

2. The method of claim 1, wherein the higher priority channel has a higher priority than the lower priority channel based on the higher priority channel being transmitted aperiodically and the lower priority channel being transmitted periodically or semi-persistently.

3. The method of claim 1, wherein the higher priority channel is transmitted at a first periodicity and the lower priority channel is transmitted at a second periodicity, and wherein the higher priority channel has a higher priority than the lower priority channel based on the first periodicity being lower than the second periodicity.

4. The method of claim 1, wherein the higher priority channel is transmitted at a first periodicity and the lower priority channel is transmitted at a second periodicity, and wherein the higher priority channel has a higher priority than the lower priority channel based on the first periodicity being higher than the second periodicity.

5. The method of claim 1, wherein the removing comprises:
   puncturing the first set of resources, wherein the at least the portion of the removed subset of resources comprises a punctured subset of resources of the first set of resources and the remaining subset of resources comprises a non-punctured subset of resources of the first set of resources.

6. The method of claim 1, wherein the removing comprises:
   performing a rate matching operation, wherein channelization for the lower priority channel is modified to account for the removed subset of resources not being available for transmission of the lower priority channel, wherein the channelization for the lower priority channel includes one or more of payload selection, channel-coding, modulation mapping, and resource-element mapping.

7. The method of claim 6, wherein the rate matching operation comprises a grant modification, and wherein the grant modification comprises:
   overriding a start and length indication value (SLIV) indicator of an allocation of the first set of resources to exclude resources overlapping the second set of resources.

8. The method of claim 6, wherein the grant modification comprises:
   overriding a slot indication for the first set of resources and using a slot following the second set of resources for the first set of resources.

9. The method of claim 1, further comprising:
   receiving an allocation of the first set of resources of the wireless communication link for transmission of the lower priority channel to the cell of the base station.

10. The method of claim 1, wherein the first set of resources comprises a first set of orthogonal frequency division multiplexing (OFDM) symbols, a first set of slots, a first set of resource elements, a first set of resource blocks, or any combination thereof of one or more radio frames and the second set of resources comprises a second set of OFDM symbols, a second set of slots, a second set of resource elements, a second set of resource blocks, or any combination thereof of the one or more radio frames.

11. The method of claim 1, wherein the overlapping between the first set of resources and the second set of resources comprises an overlap in time and frequency resources or an overlap in time resources only.

12. A method of wireless communication performed by a user equipment (UE), comprising:
   receiving, from a serving cell of a base station, an allocation of a first set of resources of a wireless communication link for transmission of a lower priority channel to the serving cell;
   detecting an overlap between the first set of resources of the wireless communication link allocated for transmission of the lower priority channel and a second set of resources of the wireless communication link allocated for transmission of a higher priority channel; and
   rejecting the allocation of the first set of resources for transmission of the lower priority channel based on the overlap,
   wherein at least one of the higher priority channel and the lower priority channel is a positioning reference signal configured to be measured by a UE to enable the UE to be located.

13. The method of claim 12, wherein the higher priority channel has a higher priority than the lower priority channel based on the higher priority channel being transmitted aperiodically and the lower priority channel being transmitted periodically or semi-persistently.

14. The method of claim 12, wherein:
   the higher priority channel is transmitted at a first periodicity and the lower priority channel is transmitted at a second periodicity, and wherein the higher priority channel has a higher priority than the lower priority channel based on the first periodicity being lower than the second periodicity, or
   the higher priority channel is transmitted at a first periodicity and the lower priority channel is transmitted at a second periodicity, and wherein the higher priority channel has a higher priority than the lower priority channel based on the first periodicity being higher than the second periodicity.

15. The method of claim 12, wherein the higher priority channel has a higher priority than the lower priority channel based on the higher priority channel being an uplink signal and the lower priority channel being a downlink signal.

16. The method of claim 12, wherein the higher priority channel has a higher priority than the lower priority channel based on the higher priority channel being a downlink signal and the lower priority channel being an uplink signal.

17. The method of claim 12, wherein:
the higher priority channel has a higher priority than the lower priority channel based on the higher priority channel being a unicast signal and the lower priority channel being a broadcast or multicast signal, or
the higher priority channel has a higher priority than the lower priority channel based on the higher priority channel being a broadcast or multicast signal and the lower priority channel being a unicast signal.

18. The method of claim 12, wherein the first set of resources comprises a first set of orthogonal frequency division multiplexing (OFDM) symbols, a first set of slots, a first set of resource elements, a first set of resource blocks, or any combination thereof of one or more radio frames and the second set of resources comprises a second set of OFDM symbols, a second set of slots, a second set of resource elements, a second set of resource blocks, or any combination thereof of the one or more radio frames.

19. The method of claim 12, wherein the overlapping between the first set of resources and the second set of resources comprises an overlap in time and frequency resources or an overlap in time resources only.

20. A user equipment (UE), comprising:
a memory;
a communication device; and
at least one processor coupled to the memory and configured to:
detect an overlap between an allocation of a first set of resources of a wireless communication link for transmission of a lower priority channel and an allocation of a second set of resources of the wireless communication link for transmission of a higher priority channel;
remove a subset of resources from the allocation of the first set of resources to generate a removed subset of resources of the first set of resources and a remaining subset of resources of the first set of resources; and
cause the communication device to transmit, to a cell of a base station, the lower priority channel on the remaining subset of resources of the first set of resources, wherein the higher priority channel is transmitted on at least a portion of the removed subset of resources of the first set of resources,
wherein the higher priority channel is a physical uplink shared channel (PUSCH) and the lower priority channel is a sounding reference signal (SRS) for positioning.

21. A user equipment (UE), comprising:
a memory;
a communication device; and
at least one processor coupled to the memory and configured to:
cause the communication device to receive, from a serving cell of a base station, an allocation of a first set of resources of a wireless communication link for transmission of a lower priority channel to the serving cell;
detect an overlap between the first set of resources of the wireless communication link allocated for transmission of the lower priority channel and a second set of resources of the wireless communication link allocated for transmission of the higher priority channel; and
reject the allocation of the first set of resources for transmission of the lower priority channel based on the overlap,
wherein at least one of the higher priority channel and the lower priority channel is a positioning reference signal configured to be measured by a UE to enable the UE to be located.

* * * * *